United States Patent
Carmincke et al.

(10) Patent No.: US 8,186,032 B2
(45) Date of Patent: May 29, 2012

(54) TOOL ARRANGEMENT FOR THE PRODUCTION OF HELICAL TEETH IN GEAR WHEELS

(75) Inventors: Wolfgang Carmincke, Scharnebeck (DE); Oliver Winkel, Kempten (DE)

(73) Assignees: Liebherr-Verzahntechnik GmbH, Kempten (DE); Fette GmbH, Schwarzenbek (DE)

(*) Notice: Subject to any disclaimer, the term of this patent is extended or adjusted under 35 U.S.C. 154(b) by 848 days.

(21) Appl. No.: 10/536,167

(22) PCT Filed: Sep. 6, 2006

(86) PCT No.: PCT/EP2006/008658
§ 371 (c)(1),
(2), (4) Date: Nov. 21, 2008

(87) PCT Pub. No.: WO2007/031219
PCT Pub. Date: Mar. 22, 2007

(65) Prior Publication Data
US 2009/0311063 A1      Dec. 17, 2009

(30) Foreign Application Priority Data
Sep. 13, 2005  (DE) .................... 20 2005 014 619 U

(51) Int. Cl.
*B23P 23/00*   (2006.01)
*B23F 19/10*   (2006.01)
*B23F 21/00*   (2006.01)
*B23F 21/16*   (2006.01)

(52) U.S. Cl. .............. 29/50; 29/56.5; 409/8; 409/11; 409/16; 407/23; 407/27; 407/20

(58) Field of Classification Search ........... 29/50, 56.5; 409/8–9, 11, 16; 407/23, 25–26, 27, 20; 451/47, 900
See application file for complete search history.

(56) References Cited

U.S. PATENT DOCUMENTS

| 4,850,155 A * | 7/1989 | Sulzer ..................... 451/47 |
| 6,839,953 B2 * | 1/2005 | Fitzgerald et al. ......... 29/56.5 |
| 2004/0109735 A1 * | 6/2004 | Arvin et al. ............... 409/12 |
| 2005/0000072 A1 * | 1/2005 | Wolff et al. .............. 29/56.5 |

FOREIGN PATENT DOCUMENTS

| DE | 3704607 A * | 8/1988 |
| DE | 19918289 | 10/2000 |
| DE | 20320294 U1 * | 5/2004 |
| DE | 20320295 U1 * | 9/2004 |
| RU | 2343048 C1 * | 1/2009 |

OTHER PUBLICATIONS

Machine Translation of DE 19918289, which DE '289 was published Oct. 2000.*
Machine Translation of a German term from Yahoo Babel Fish website, printed from the internet on Aug. 25, 2011.*

* cited by examiner

*Primary Examiner* — Erica E Cadugan
(74) *Attorney, Agent, or Firm* — Vidas, Arrett & Steinkraus, P.A.

(57) ABSTRACT

Tool arrangement for the production of helical teeth in gear wheels, wherein a roughing hob (20), at least one deburring cutter (16, 18) and a finishing hob (12) can be fastened on a common mandrel (14) in a predetermined rotational position relative to one another, and the teeth of the finishing hob, which are situated along a helical line, each have a different cross section such that the engagement angle of the right or left flanks decreases continuously starting from a maximum value of the first tooth up to the last tooth, and the maximum engagement angle of the right flanks of the first or last tooth coincides with the minimum engagement angle of the left flanks, and vice versa.

6 Claims, 2 Drawing Sheets

TOOL ARRANGEMENT FOR THE PRODUCTION OF HELICAL TEETH IN GEAR WHEELS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The production of helical teeth in gear wheels by means of a hob is known for a long time. It is mostly done by axial generating methods. It is also known to produce helical teeth by means of the diagonal generating method, i.e. the feed occurs both axially and tangentially. The tooth flanks are not formed accurately but approximated facet-like by a finite number of generating cuts. Every generating cut of the generating cut profile is tangent to the theoretical involute profile in one point while all other points deviate to a greater or lesser extent from the involute profile. The scalelike surface structure is smoothed out by a subsequent finishing process such as generative grinding. The theoretical exact involute profile is altered for optimizing bearing behaviour and minimizing noise development. It is common practice to generate a specific profile crowning (tip relief) to achieve a hitchless operation. Profile crowning or tip relief is accomplished by appropriately profiling the tool's flanks. A correction of the flank geometry over the width of the tooth space, i.e. a specific helix crowning or conicity of the tooth space and slope of the crowning is achieved either through movements of the workpiece or movements of the tool that vary the axial space between the tool and the toothed gear passing the tooth space in axial direction. With spur geared cylindrical gears this method leads to the desired result. In case the shaft angle between workpiece and tool differs from 90°, the contact ratios cause an unequal correction of the corresponding left or right flanks of a tooth space.

It is known from "Pfauter-Walzfräsen" Teil I, Verfahren, Maschinen, Werkzeuge, Anwendungstechnik, Wechselräder, Springerverlag p. 436, the entire contents of which is incorporated herein by reference, to use hobs with different tooth thickness and tooth profile in axial direction for the production of helix crowned gearing and to work with the diagonal generating method. In this process the hob is set, so that its widest tooth space comes in operation at the center of the workpiece gearing thus forming the biggest tooth thickness there. Thicker cutting teeth work at both ends, i.e. the workpiece teeth get thinner there (double-duplex-character).

DE 37 04 607 A1, the entire contents of which is incorporated herein by reference, discloses a method, that allows longitudinal corrections of the gear teeth by varying distances and avoids their disadvantageous distortions at the same time. With the known method a worm grinding wheel is used in continuous diagonal generating method, whereas the pressure angle of the right and left flanks decreases continuously starting from a maximum value from one end of the worm to the other end. Coming at this from the knowledge that in every area a tooth space—in axial direction of the toothed gear—is related to a certain axial area of the worm. Since the geometry of the flanks of the worm's windings varies in axial direction, the tooth space to be created is generated over the width of the tooth space by a permanently changing tool. During the grinding movement between workpiece and tool the worm is not only scrolled axially to the workpiece but also tangentially, so that the approach area of a tooth space is processed by different worm windings than the recess area of that tooth space, viewed over the height and width of the workpiece respectively. In order to achieve the desired corrections on the involute teeth on the one hand and to avoid the described distortions on the other hand, the flanks of the worm gear of the worm tool have different pressure angles, i.e. pressure angle and tooth thickness vary from one end of the tool to the other end, so that their distortion effect is compensated in connection with an axial correction.

The known method requires that first of all the workpiece is pre-profiled by means of a roughing hob, usually after the axial generating method. Afterwards, it has to be finished for instance with a gear grinding machine in order to achieve a correction by means of the described worm grinding wheel. Naturally, this is associated with increased production complexity.

Before or after the finishing the teeth of a toothed gear have to be deburred or bevelled, respectively. For this purpose several methods became known.

Additionally, from DE 203 20 294, it became known to mount a deburring cutter on the same tool shaft as the finishing hob. The deburring cutter resembles a disc milling cutter, its cutting teeth being helix curved and the deburring cutter being formed multithreaded with at least one tooth per gear. In this manner both the hobbing and the deburring occur in the continuous cycle. The tool shaft of hobbing machines is adjustable in space as is generally known. Finishing the hobbing process the hob is adjusted so that the deburring tool can be engaged with the leading edges of the tooth profile by rotating with the shaft in order to process the leading edges of the tooth profile consecutively according to the hobbing process.

The object of the invention is to provide a tool arrangement that can be used to produce a deburred and bevelled helical gearing for spur gears with little complexity in such a manner, that the gearing is twist-free

BRIEF SUMMARY OF THE INVENTION

The tool arrangement according to the present invention provides for a twist-free gearing. This means that the flanks of the engaged gear teeth are engaged approximately in the centre between tip and root in approximately identical areas with respect to a plane of the toothed gears that runs through the centre. A twist-free gearing with corrected tooth flanks is obtained by means of a finishing hob, the teeth of the finishing hob, which are situated along a helical line, each have a different cross section such that the engagement angle decreases continuously starting from a maximum value of the first tooth up to the last tooth, and the maximum engagement angle of the opposing flank of the first or last tooth coincides with the minimum engagement angle of the other flank, and vice versa.

With this invention, it was realized that the per se known means of a worm grinding wheel can be transferred to a hob. If the finishing hob is designed appropriately, it can be mounted with the roughing hob on a common mandrel. Thus, the toothed gear of one setting that is to be produced is finished entirely on the machine tool.

The deburring can be carried out on the same machine as well by mounting at least one deburring cutter on the mandrel as disclosed in DE 203 20 294, the entire contents of which is incorporated herein by reference.

According to one embodiment of the invention, the finishing hob and mandrel are formed in one piece. Therefore, the remaining tools have to be mounted on the mandrel correspondingly, whereas according to one embodiment of the invention, the roughing hob and the deburring cutter are fixated on the mandrel by a clamping nut and a spacer ring.

The axial position of the deburring cutters on the mandrel is not specified. Preferably, they are located between roughing- and finishing hob.

BRIEF DESCRIPTION OF THE SEVERAL VIEWS OF THE DRAWINGS

The invention will be explained with respect to figures in more detail below.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
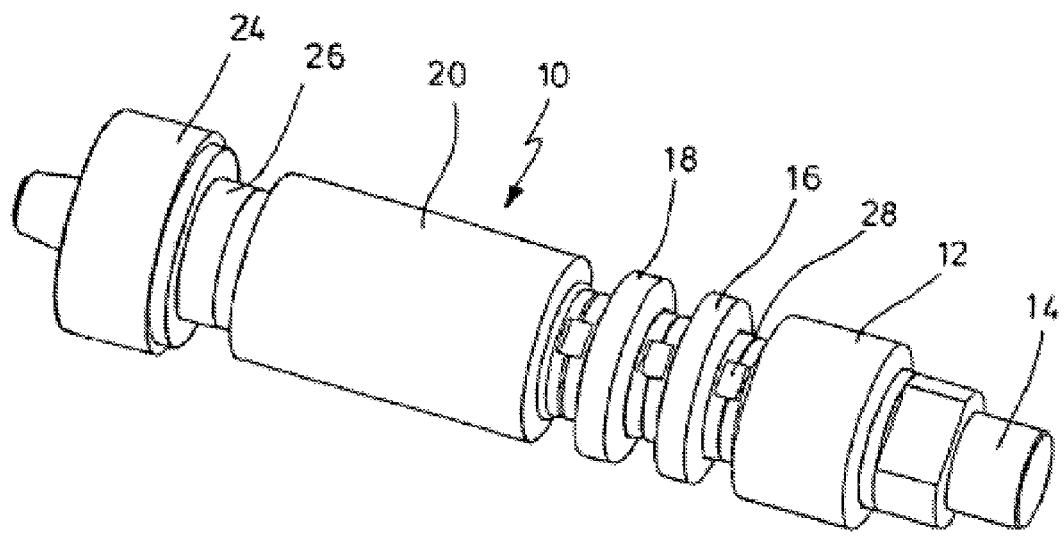
FIG. 1 is a perspective schematic view of a tool arrangement according to the invention.
Figure 2:
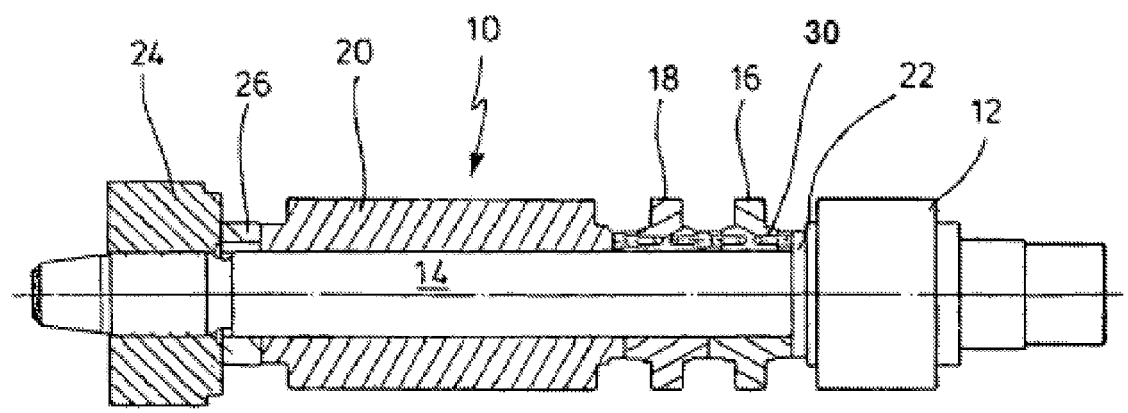
FIG. 2 is a sectional view of a part of the tool arrangement according to FIG. 1.

FIGS. 1 and 2 illustrate a tool arrangement 10 for the production of a helical gearing on a spur gear. A finishing hob 12 is formed in one piece with a mandrel 14. Segments of the mandrel or the shaft protrude over both sides of the finishing hob 12. Two deburring cutters 16 and 18 and a roughing hob 20 are arranged on the mandrel 14. They abut a left collar 22 of the finishing hob 12 and are tightened to one another by a clamping nut 24 over a spacer ring 26 at the other end. The shown cutters each have axial collars having a radial recess on the sides facing one another in which a fitting piece 28 is inserted. As can be seen in FIG. 2, the fitting pieces are each arranged by a screw 30. That way the rotational position of the individual cutters 12 to 20 towards each other is determined.

The roughing hob 20 and the deburring cutters 14, 18 are arranged in the known manner. Regarding the deburring cutters, they can be formed according to that prior art. The finishing hob 12 has a special design regarding his teeth in such a way that the cross-sectional profile of each tooth (not shown here) differs from the preceding and the succeeding one. In that way the engagement angles vary from one tooth to another to get a twist-free gearing as is achieved in connection with a generating method according to DE 37 04 607 A1.

Figure 3:
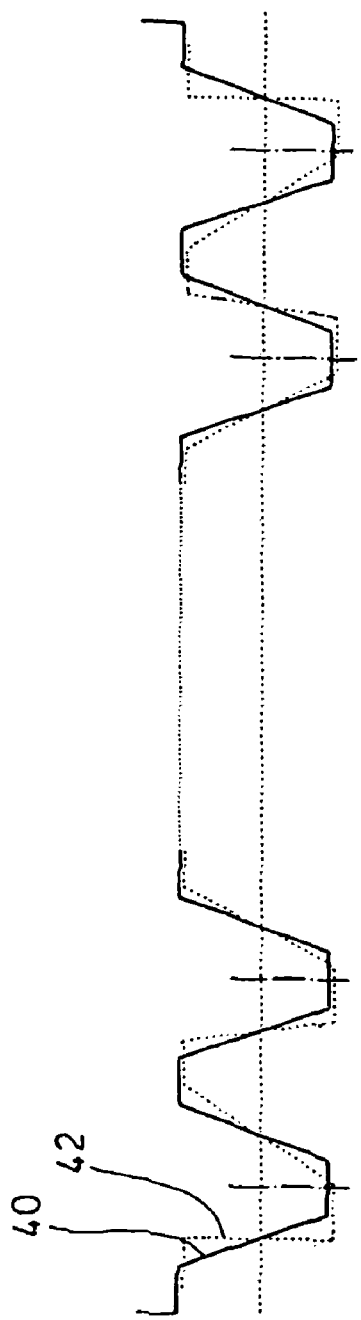
FIG. 3 is a schematic view of the flank geometry of the individual teeth of the finishing hob according to the tool arrangement according to FIGS. 1 and 2 in developed view.
Figure 4:
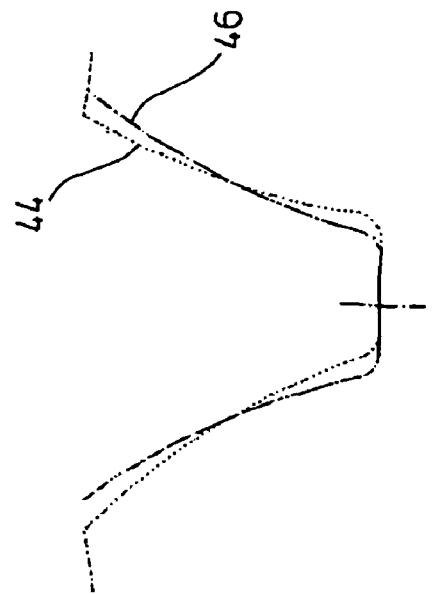
FIG. 4 is an axial view of two tooth profiles of a toothed gear constructed according to the invention.
Figure 4:
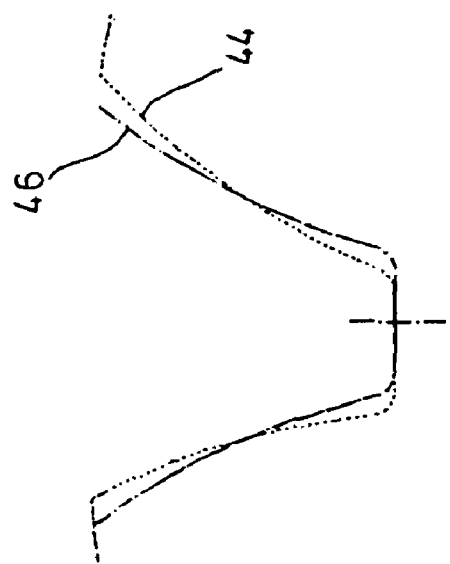

The profile of the first and last teeth of the finishing hob in direction of the helical line is illustrated in FIG. 3, whereas the teeth without correction are shown in solid line 40 and the corrected tooth profile is shown in a dashed line 42. Passing through a tooth space, the right area of the teeth shown in the left part of FIG. 3 comes into engagement from the bottom up in the bottom area of the tooth space and the left tooth area in FIG. 3 comes into engagement with the upper area of the tooth space. So the tooth at the right end of FIG. 3 can be profiled in such a way that it takes away more material in the root area of the right tooth flank than in the root area of the left flank. This can be seen in FIG. 4, where again dashed line indicates the corrected tooth flank of the toothed gear and the solid line 46 indicates the uncorrected tooth flank. In the left area of FIG. 3 the teeth are profiled such that in the root area of the left flank (see FIG. 4) more material is taken away than in the root area of the right flank.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Tool arrangement for the production of helical gearing in gear wheels, characterized in that a roughing hob (20), at least one deburring cutter (16, 18) and a finishing hob (12) can be fastened on a common mandrel (14) in a predetermined rotational position relative to one another, and the teeth of the finishing hob (12), which are situated along a helical line, each have a different cross section such that the engagement angle of the right or left side flanks of the teeth decreases continuously starting from a maximum value of the first tooth up to the last tooth, and the maximum engagement angle of the right flanks of the first or last tooth coincides with the minimum engagement angle of the left flanks, and vice versa, and the finishing hob (12) and mandrel (14) are formed in one piece, and the roughing hob (20) and the at least one deburring cutter (16, 18) are fixated on the mandrel (14) by a clamping nut (24) and a spacer ring (26).

2. Tool arrangement according to claim 1, characterized in that collars of each of the at least one deburring cutter have a recess that extends radially with respect to the longitudinal direction of the mandrel (14), in which recess or recesses exactly matching fitting pieces (28) are inserted, the fitting pieces each being fastened by a screw (30) extending in a longitudinal direction of the mandrel (14).

3. Tool arrangement according to claim 1, characterized in that the at least one deburring cutter (16, 18) is arranged between the roughing hob (20) and the finishing hob (12).

4. Tool arrangement for the production of helical gearing in gear wheels, characterized in that a roughing hob (20), at least one deburring cutter (16, 18) and a finishing hob (12) can be fastened on a common mandrel (14), the mandrel (14) having a longitudinal axis, in a predetermined rotational position relative to one another, and the teeth of the finishing hob (12), which are situated along a helical line, each have a different cross section such that the engagement angle of the right or left side flanks of the teeth decreases continuously starting from a maximum value of the first tooth up to the last tooth, and the maximum engagement angle of the right flanks of the first or last tooth coincides with the minimum engagement angle of the left flanks, and vice versa, and the finishing hob (12) and mandrel (14) are formed in one piece, and collars of the at least one deburring cutter (16, 18) each have a radial recess in which matching fitting pieces (28) are inserted, the fitting pieces each being fastened by a screw (30) extending in the axial direction of the mandrel (14).

5. Tool arrangement according to claim 4, wherein the roughing hob (20) and the at least one deburring cutter (16, 18) are fixated on the mandrel (14) by a clamping nut (24) and a spacer ring (26).

6. Tool arrangement according to claim 4, wherein the at least one deburring cutter (16, 18) is arranged between the roughing hob (20) and the finishing hob (12).

* * * * *